Aug. 28, 1962    S. J. FRAENKEL    3,051,458
MIXER FIXTURE
Filed May 31, 1961
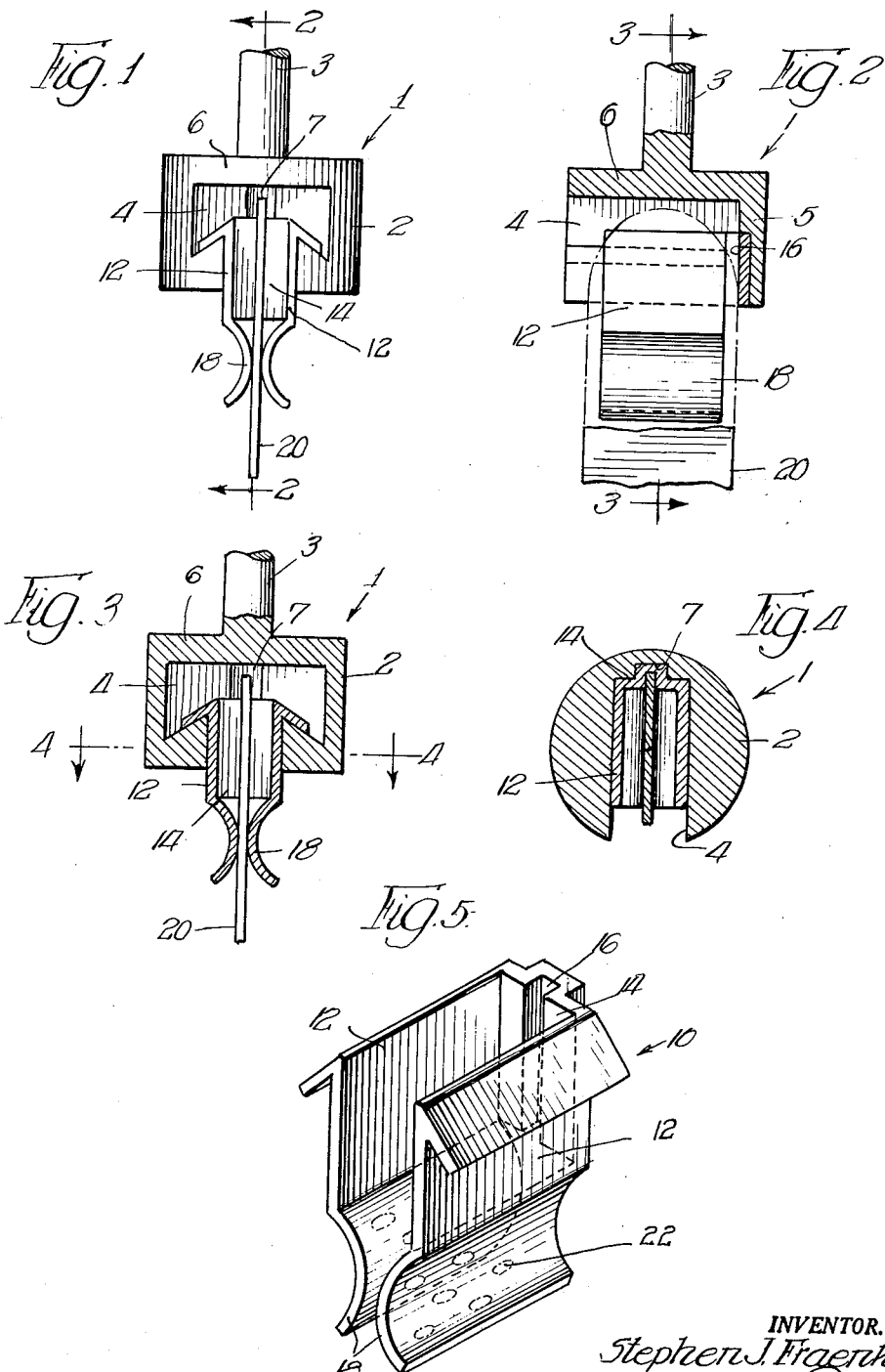

3,051,458
MIXER FIXTURE
Stephen J. Fraenkel, Winnetka, Ill., assignor to Stanray Corporation, Chicago, Ill., a corporation of Delaware
Filed May 31, 1961, Ser. No. 113,824
5 Claims. (Cl. 259—138)

This invention relates to improvements in devices for attachment to a rotating tool or chuck for holding an implement such as an expendable stirrer or the like which may be discarded if desirable after use.

It is the principal object of the invention to provide such a device, or adaptor, which holds the stirrer in place without the use of thumb screws or other fastening means.

Another object is to provide such a device wherein the centrifugal force of the rotating implement will hold the stirring element securely in the device or adaptor.

A further object of the invention is to design the device so that when it rotates, an unbalanced centrifugal force exists, as the forward longitudinal half of the device weighs more than the rear half (hereinafter explained) and therefore the higher the speed of rotation the more securely the stirring implement is held in place.

Other objects and advantages of the invention will appear in the following description thereof.

Referring now to the accompanying drawing forming part of this application and wherein like reference characters indicate like parts:

FIGURE 1 is a side elevation of the device.
FIGURE 2 is a cross section on line 2—2 of FIGURE 1.
FIGURE 3 is a cross section on line 3—3 of FIGURE 2
FIGURE 4 is a cross section on line 4—4 of FIGURE 3.
FIGURE 5 is an isometric perspective view of the removable clip portion of the device.

Broadly, the invention comprises a spool-like structure indicated at 1 which has a cylindrical body portion 2 and an axial shaft 3 projecting from the upper end of the body portion. The shaft is of a size and length to fit within a hand drill chuck, for example. The body portion 2 is provided with an opening 4 therein, which opening, as seen in FIGURE 4, extends from one side to within a short distance from the other side, leaving a rear wall indicated at 5, and a top wall indicated at 6. The rear wall 5 is provided with a longitudinally disposed slot 7 for the purpose hereinafter described. In side elevation, this opening is somewhat T-shaped as seen in FIGURES 1 and 3, and the juncture of the bar and shank of the T is acute angled.

A generally channel-shaped clip 10 is provided, it being constructed of spring steel, having side walls comprising upper flat parallel portions 12 connected by a rear wall 14 having a narrow transverse channel 16 formed therein. Depending from the lower edge of the side walls 12 are arcuate portions 18 which extend toward each other for the purpose of holding therebetween a paddle 20 or the like which can function as a stirring implement when rotated. A practical application of the device is that it will be small, for use with an electric drill, and the stirring element will be small flat pieces of wood, as for example a tongue depressor, which can be discarded after a single use, eliminating any cleaning problem after the stirrer is used. The upper margin of the walls 12 are turned outwardly and downwardly at the same angle as the angle of the side walls of the T opening 4 so as to rest thereon as shown in FIGURES 1 and 3. The walls 12 are spaced to fit within the side walls of the opening 4 and the channel portion 16 fits within the slot 7 when the clip 10 is slid laterally into the opening 4 of the spool-like structure. The arcuate portions 18 when not in use almost contact each other so that the stirring element can be installed therebetween and held by the resilience of the arcuate portions. The rear edge of the stirring element 20 fits within the channel 16 at the rear of the clip 10.

As will be obvious when viewing FIGS. 2 and 4, when the assembly is rotated, an unbalanced centrifugal force exists since the forward half of the clip (to the right in FIG. 2) weighs more than the rear half. This is clearly obvious in FIG. 4. Centrifugal force will therefore hold the clip 12 in the spool 2, and the higher the speed of rotation the more securely the clip 2 will be held in place. When rotation stops and the mixing operation is finished, the stirring element 20 and/or the clip 12 may be slid laterally out of the spool 2, and the stirring element thrown away. By suitably shaping the clip 12 while preserving the delicate unbalance in weight distribution, other accessories could be provided for. It is also possible to control the "firmness of retention," i.e., the centrifugal force level, by providing several holes in the front half of the clip as indicated in dotted lines at 22. This further unbalances the weight on opposite sides of the longitudinal axis of the clip.

From the foregoing it is obvious that a new and novel means has been provided for holding an expendable stirring element, such as a tongue depressor, firmly therein without the use of clamps, set screws, or the like. When the depressor 20 is slid laterally between the arcuate portions 18, with the rear edge positioned within the slot 7, and the device rotated by a drill motor or the like, the depressor may be used to mix or stir paint or other material. When the mixing operation is completed, the stirring element may be thrown away if desired.

Having thus described my invention, what I claim and desire to secure by Letters Patent is:

1. An improved mixing or stirring apparatus comprising in combination a spool-like element, a shaft extending axially from said element for attachment to rotating means, said spool-like element having a hollow body portion with a slot in the rear wall thereof, means holding a flat stirring member in said hollow body with a portion of said means within said slot, said means being unbalanced on opposite sides of its longitudinal axis of rotation, whereby upon rotation of said element centrifugal force will hold the means within said hollow body.

2. A mixing and stirring apparatus comprising in combination a hollow rotatable element, means for selectively rotating said element, a clip for removably holding a stirring element, said clip laterally installed within said rotatable element, and said clip being unbalanced on opposite sides of its axis of rotation whereby upon rotation of said element centrifugal force will hold said clip and stirring element within the hollow body.

3. Means for holding a flat elongated member within a hollow rotatable element, said means comprising a clip removably installed within said element, said clip having means for removably holding a stirring element and said clip being unbalanced on opposite sides of its axis of rotation, whereby upon rotation of said element centrifugal force will hold said clip and stirring element within the hollow rotatable element.

4. A mixing and stirring apparatus comprising in combination a hollow rotatable element, means for selectively rotating said element, a clip for removably holding a stirring element, said clip being installed within said rotatable element, and said clip being unbalanced on opposite sides of its axis of rotation whereby upon rotation of said element centrifugal force will hold said clip and stirring element within the hollow body.

5. An improved mixing or stirring apparatus comprising in combination a hollow rotatable element, means for attaching said element to rotating means, said element having a slot in a wall thereof, means holding a stirring member in said hollow element, with a portion of said means within said slot, said second mentioned means being unbalanced on opposite sides of its axis of rotation, whereby upon rotation of said element centrifugal force will hold the stirring element within said hollow element.

No references cited.

UNITED STATES PATENT OFFICE
CERTIFICATE OF CORRECTION

Patent No. 3,051,458                        August 28, 1962

Stephen J. Fraenkel

It is hereby certified that error appears in the above numbered patent requiring correction and that the said Letters Patent should read as corrected below.

Column 2, lines 18 and 19, strike out "hold the clip 12 in the spool" and insert instead -- bias the heavier longitudinal half of the clip 10 against the rear wall 5 of the spoollike element --; line 20, for "2" read -- 10 --; line 22, for "12" read -- 10 --; line 24, for "12" read -- 10 --; line 28, after "front" insert -- longitudinal --; line 37, after "18" insert -- of the clip 10 --; same line 37, before "rear" insert -- channel 16 of the --.

Signed and sealed this 2nd day of April 1963.

(SEAL)
Attest:

ESTON G. JOHNSON                          DAVID L. LADD
Attesting Officer                            Commissioner of Patents